No. 700,014. Patented May 13, 1902.
S. P. BUCK.
ADJUSTABLE BUSHING.
(Application filed Aug. 12, 1901.)
(No Model.)

Witnesses
Geo. E. French.
Emily R. Peck

Inventor
S. P. Buck,
By A. S. Pattison
Attorney

UNITED STATES PATENT OFFICE.

STERLING P. BUCK, OF FRONT ROYAL, VIRGINIA.

ADJUSTABLE BUSHING.

SPECIFICATION forming part of Letters Patent No. 700,014, dated May 13, 1902.

Application filed August 12, 1901. Serial No. 71,828. (No model.)

*To all whom it may concern:*

Be it known that I, STERLING P. BUCK, a citizen of the United States, residing at Front Royal, in the county of Warren and State of Virginia, have invented new and useful Improvements in Adjustable Bushings, of which the following is a specification.

My invention relates to improvements in adjustable bushings which are adapted for application in all situations where an adjustable bushing is desired.

My invention is hereinafter shown as a separate bushing adapted to be used in connection with bearing-cups as illustrative of one of the uses to which the bushing may be applied and also the bushing as a separate device independent of the application thereof.

Figure 1:
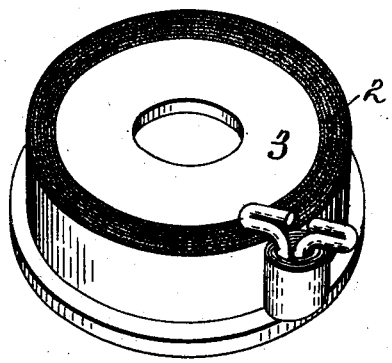
Figure 2:
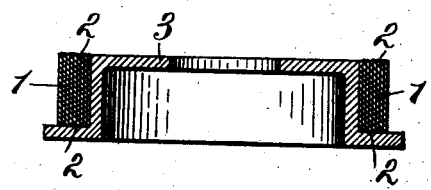
Figure 3:
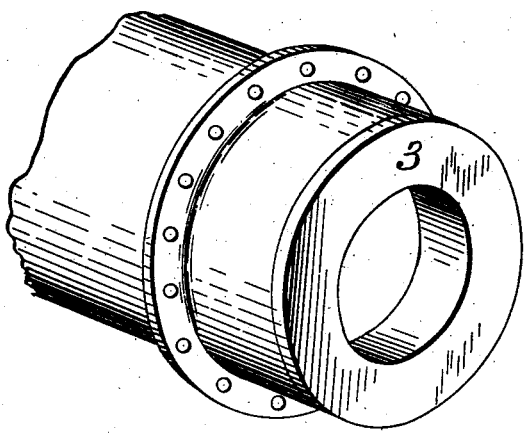
Figure 4:
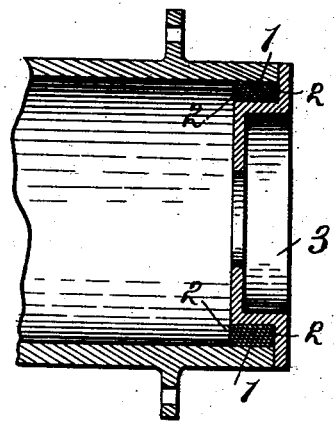

In the accompanying drawings, Figure 1 is a perspective view of my improved adjustable bushing. Fig. 2 is a transverse sectional view thereof. Fig. 3 is a detached perspective view of a bearing-cup with my invention applied thereto. Fig. 4 is a cross-sectional view of the same.

The object of my invention is to provide an adjustable bushing consisting of any desired metal, which may be united either by soldering or by brazing, according to the requirements.

In the accompanying drawings, 1 indicates a strip of suitable metal wound in the form of a ring and the strip united by means of soldering, brazing, or otherwise for the purpose of holding the strip into a compact bushing. When it is desired to regulate either the internal or external size of the bushing, it is only necessary to roll off or pull sufficient of the strip away from the ring, as indicated, to bring the bushing to the desired size. In some cases it may be necessary to use a key, as illustrated, for the purpose of rolling the strip away from the compact ring, and especially when the strip is composed of steel and is brazed. Preferably the strip of which the bushing is formed is either soldered or brazed at the edge, as indicated at 2, which will be found amply sufficient to hold the strip into a compact bushing, whether it be soldered or brazed.

In Fig. 1 I show the bushing as being attached to the member 3 it is adapted to be used in connection with. In that figure it is shown as being attached to a bearing-cup for the purpose of regulating the exterior diameter of the cup, and thus adapting it to fit openings of various sizes.

While I only show the bushing as applied to a bearing-cup, it will be readily understood that an adjustable bushing of this nature is adapted to uses in other connections, and I do not therefore limit my invention to the use of the bushing for bearing-cups.

When the bushing is made as a separate device and is not connected with the part to which it is applied, both the internal and external diameter of the bushing are readily adjusted by the removal of the strip.

Through the medium of an adjustable bushing of the form herein shown and described the repairer or other person having use for such a device is enabled to readily and quickly adjust the size of the member to which it is applied or to adjust the size of the bushing to be itself placed in an opening and to also receive the member it is intended to properly support in the opening in which it is placed.

Having thus described my invention, what I claim, and desire to secure by Letters Patent, is—

1. An adjustable bushing or packing consisting of a strip of thin flat metal wound in the form of a roll and solder connecting the edges of said strip, substantially as described.

2. An adjustable bushing or packing consisting of a strip of thin flat flexible metal wound in the form of a roll and the edges of said strip soldered together, whereby a bushing or packing is formed with smooth solid ends, substantially as described.

3. The combination with a bearing-cup, of an adjustable bushing consisting of a thin flat flexible strip of metal wound upon said cup and solder connecting the edges of said strip, whereby a bushing is formed with smooth solid ends, substantially as described.

In testimony whereof I have hereunto set my hand in the presence of two subscribing witnesses.

STERLING P. BUCK.

Witnesses:
M. F. HANSBROUGH,
L. F. HANSBROUGH.